3,666,430
GELLED ORGANIC LIQUIDS

Desmond Wilfrid John Osmond, Windsor, and Frederick Andrew Waite, Slough, England, assignors to Imperial Chemical Industries Limited, London, England
No Drawing. Filed June 17, 1968, Ser. No. 737,395
Claims priority, application Great Britain, June 20, 1967, 28,446/67
Int. Cl. C10l 7/02
U.S. Cl. 44—7 D                  10 Claims

ABSTRACT OF THE DISCLOSURE

Gelled hydrocarbon liquid suitable for use as a fuel in internal combustion engines is made by incorporating in the liquid polymeric material which is solvated by the liquid and contains polar groups which form associative bonds and so produce a crosslinked polymer structure. The associative bonds can be broken and re-made without changing the nature of the polar groups and so the gelled liquid will flow on being subjected to mechanical treatment, such as pumping, and will revert to the gelled state on cessation or shortly after cessation of the mechanical treatment.

---

This invention relates to gelled hydrocarbon liquids of the type useable in internal combustion engines, particularly gas turbine engines, to aircraft fuelled with such gelled hydrocarbon liquids and to processes of loading aircraft with such fuels.

It is desirable to produce gelled organic liquids which will flow on being subjected to mechanical treatment, such as pumping, so that they can be transferred along pipes and which will revert to the gelled state on cessation or shortly after cessation of the mechanical treatment. For example, it is desirable to produce a gelled hydrocarbon liquid for use in aircraft engines which can be transferred along pipelines from tank to tank and/or from tank to engine but which, in the event of a crash and/or spillage will retain a gel structure and so minimize the spread of fire.

Although the use of crosslinked rubbery polymers as gelling agents for hydrocarbon liquids has been proposed, the gelled liquids do not meet the above requirements in that the gel may be difficult to prepare and if it is caused to flow by mechanical treatment it will not revert to its original gelled state. Metal soaps are used for gelling hydrocarbon liquids but the resulting gels are not suitable for use in engines due to the high metal content and to sensitivity of the strength of the gel to contaminants such as water and other polar liquids.

We have found that a gelled hydrocarbon liquid suitable for use as a fuel in internal combustion engines may be made by incorporating in the liquid polymeric material which is solvated by the liquid and contains polar groups which form associative bonds and so produce a crosslinked polymer structure.

By "associative bonds" we mean bonds arising from electrostatic attraction between polar and/or dipolar charges in the polar groups, these bonds being ones which can be broken and re-made without changing the nature of the polar groups. We specifically exclude co-valent bonds which result from a sharing of electron orbits between polar groups.

The bond energy between the groups should be at least that corresponding to the energy of hydrogen bonds formed between —OH groups of ROH reacting with —O— groups of ROR' in the hydrocarbon liquid, where R and R' are alkyl. The bond energy should not be comparable with or greater than that of a typical C—C co-valent bond. The hydrocarbon liquid may contain a small proportion of other liquids, such as ethers, esters, ketones and nitro-paraffins, particularly when the energy of the associative bond in the hydrocarbon liquid is higher than the minimum stated above. However, since the nature of the liquid has an effect on the associative bond energy of any particular pair of groups, the energy decreasing as the polarity of the liquid increases, the hydrocarbon liquids to which this invention is to be applied should not contain a substanital proportion of a miscible protolytic liquid such as methanol.

The polar groups which may be simple or compound may associatively bond with like groups in the same type of polymer or the associative bonding may be between pairs of complementary interacting polar groups, the complementary groups preferably each being in different polymers which are blended in the liquid. The blending may be carried out by mixing hydrocarbon liquids each containing one of the different polymers. When fuelling aircraft this blending advantageously is carried out as the liquid is being transferred to the aircraft, preferably at or just before the fuel inlet to the aircraft. In this way pumping of the gelled fuel is kept to a minimum.

Simple polar groups are those containing a single polar group and in general, and subject to the above-described limitations, suitable simple groups for associatively crosslinking the polymer structure are those which provide hydrogen bonds and bonds resulting from interaction between ions or between strong dipoles such as those derived from charge-separated ion pairs.

Suitable hydrogen bonds are, for example, those between hydroxyl, carboxyl, amine, amide and mercaptan groups, either between one type only or between two types of these groups, and between one of these groups and an ether oxygen or thio ether group or a tertiary base.

Suitable bonds between strong dipoles include those between Zwitter ions, such as betaines and sulphobetaines, quaternary amomnium salts and sodium or other metal salts of acids.

Suitable bonds between ions are those between quaternary bases and acid groups such as carboxylic, sulphonic, phosphonic acids and sulphate half-esters and phosphate esters, between amine and sulphonic or phosphonic acids and between polyvalent metal ions, such as Ca, Mg and Al and acid groups. Associative bonds between such ions are strong and those between, for example, quaternary ammonium bases and sulphonic or sulphuric half-ester acids represents the strongest which can be used in application of this invention.

Compound polar groups may be provided in the solvated polymer by a multiplicity of weak polar groups which mutually reinforce each other as a result of being located on a polymer segment which is insoluble and consequently is in a collapsed condition in the hydrocarbon liquid. Weak polar groups which can reinforce each other in this manner to provide an associatively bonding compound polar group include ether oxygen, ester carbonyl and nitrile.

These polar groups whether simple or compound must be present in polymers and with respect to these groups the polymers should have an average number functionality of greater than 2 and preferably greater than 10. In general, the weaker the bond energy or the greater the molecular weight of the polymer, the higher should be the functionality of the polymer; it can be as high as 100 or more in polymers of molecular weight of $10^6$ or more containing polar groups producing medium strength (e.g. COOH—NH$_2$) or weaker bonds.

The proportion of polymer used is suitably in the range 0.1–10% by weight of the liquid to be gelled.

Even when metal ions are present in the polymers used in the gelled composition of this invention the proportion of metal so introduced into the hydrocarbon is, due to the high efficiency of the gelling agent and its low metal content, very low and can be acceptable even when the gelled product is used as fuel.

The solvated polymer may be soluble in the liquid or may be in the form of particles which are swollen by the liquid. In the former case the polymer chains are linked by associative bonds between adjacent polymer chains and in the latter case, the swollen particles are linked together by associative bonds between polar groups on adjacent particles. In both cases, a three dimensional polymer structure is formed which is solvated by the liquid and so provides a gel.

Where the polymer is soluble in the liquid, the gel effect of the polymer may be enhanced by incorporation of dispersed particles of combustible material also containing polar groups which will form associative bonds with the polar group of the soluble polymer. The particles provide highly functional nodal points in the crosslinked structure. It is preferred that the polar groups in the particles are complementary to those in the dissolved polymer so that the associative bonds will in the main be between the particles and the dissolved polymer.

In a preferred embodiment of the invention, therefore, the soluble polymer containing polar groups is used in association with polymer particles which are swellable by the organic liquids and contain complementary polar groups.

In another embodiment of the invention, the particles used in conjunction with the soluble polymer are of combustible material which is non-solvated by the liquid and contains polar groups. Such materials include amorphous materials such as carbon black, fibrous cellulosic or crystalline associated compounds such as the reaction product of n-butyrolactone with long chain amines derived from coconut oil, and crystalline organic materials such as mono- and poly-nuclear aromatic compounds containing carboxyl, hydroxyl, amino, amido, sulphonic, phosphonic or other polar groups.

The size of the particles used is preferably in the range 0.01–5$\mu$; where the particles are of polymer swellable by the liquid, swelling may result in an increase in volume of the particles of up to ten times or more their original volume but this preferred size range is the size of the particles in the unswollen condition.

Preferably the total proportion of gel-forming polymer in dissolved and/or particulate form is not greater than 10% by weight of the liquid to be gelled.

The molecular weight of the soluble polymer must be at least 10,000 (viscosity average) and preferably at least 100,000. When used at the lower concentration the polymer should be of higher molecular weight which may be $10^6$ or more. However, polymers of molecular weights of more than $10^6$ should not be used at concentrations of more than 3% by weight of the liquid.

Swollen polymer particles, whether they function as primary gellant or nodal points, suitably comprise polymer which would be soluble in the liquid but which is crosslinked by co-valent or strong associative bonds so that it can then only swell in the liquid. In this case the degree of swelling will depend on the crosslink density of the polymer and this can vary from 0.1 to 10% depending on the precise nature of the polymer and liquid. By crosslink density we mean that percentage of the units in a polymer chain which carry a crosslink. Crosslinking of the polymer in the particles can be achieved by use of a proportion of difunctional monomer and by use of co-monomers containing groups which will crosslink by a subsequent condensation reaction or by strong association.

Processes for making dispersions of poymer particles in organic liquids by dispersion polymerisation are described for example in British Pat. No. 941,305. Where the particles are to be swollen by hydrocarbon they can be made by dispersion polymerisation in a polar liquid and then transferred to the hydrocarbon liquid to be gelled. Where they are to be non-swollen they can be made in a hydrocarbon liquid.

The polymer used in this invention will generally be of the free-radical addition type since these are the simplest to make.

For use in hydrocarbons of a mainly aliphatic nature suitable solvatable polymers are those of long chain esters of unsaturated acids and of unsaturated alcohols, e.g. stearyl, lauryl, octyl, 2-ethyl hexyl and hexyl esters of acrylic or methacrylic acid and corresponding long chain acid esters of vinyl alcohol such as vinyl stearate, etc. A corresponding range of long chain ethers of unsaturated alcohols, e.g. vinyl octa-decyl ether may also be used as monomers. Also suitable are polymers of alkenes such as butadiene, isoprene and isobutylene, and non-crystalline polymers of ethylene and propylene.

For use in hydrocarbons of a mainly aromatic nature similar polymers may be used and, in addition, shorter chain analogues, e.g. polymers of ethoxy ethyl methacrylate, methyl methacrylate and ethyl acrylate. Other suitable polymers include those of vinyl benzenes such as styrene and vinyl toluene.

The term polymer as used above includes copolymers and suitable polar groups in suitable proportions may be introduced into the polymer by use of a co-monomer containing such a group. Suitable co-monomers for introducing simple polar groups which are acidic include acrylic and methacrylic acids, maleic anhydride, vinyl sulphonic acid, styrene sulphonic acid, vinyl phosphate and phosphonic esters of unsaturated OH-containing compounds such as the phosphonic ester of hydroxy isopropyl methacrylate. Suitable co-monomers for introducing simple polar groups which are basic include vinyl pyridine, vinyl dimethylamine, N,N-dimethylamino-ethyl methacrylate and tertiary butylamino ethyl (meth)acrylate. Groups such as sulphones may be introduced by vinyl methyl sulphone. Strongly ionic and dipolar groups are preferably introduced after the polymer has been formed, e.g. by neutralisation of acidic groups or quaternisation of basic groups.

Suitable monomers containing weak polar groups which in combination can provide a compound polar group on the solvated polymer chain include vinyl methyl ether, vinyl methyl ketone, methyl methacrylate, methyl acrylate, (meth)acrylonitrile, vinyl chloride and vinyl acetate. Such monomers can provide a side chain or segment which will be non-solvated by hydrocarbon liquids and which will consequently provide a compound polar group on a main polymer chain solvated by the hydrocarbon liquid.

Another class of addition polymers suitable for use in this invention are hydrocarbon polymers such as those derived from alkenes. Unfortunately the preparation of these usually involves ionic polymerisation and since the polar groups required in the final polymer may interfere with the ionic catalyst used in the polymerisation, it is usually necessary first to prepare the hydrocarbon polymer and then modify it to introduce the polar groups required for the associative bond. Suitable hydrocarbon polymers are non-crystalline polymers and copolymers derived from monomers such as ethylene, propylene, isobutylene, butadiene, isoprene and other higher $\alpha$-alkenes, e.g. petroleum feed stock alkenes. Alternatively, natural rubber may be used. These polymers are then modified to introduce the desired polar groups.

Where the hydrocarbon polymer contains residual unsaturation, polar groups can be introduced by addition reactions, e.g. by addition of thiols such as thioglycollic acid, aldehydes or halogen or by epoxidation. In some of these cases the groups so introduced may need further modification to provide the desired polar groups; for example the halogen groups or the hydroxyl groups resulting from addition of aldehyde can be so modified. Alternatively, groups may be introduced by reaction of a carbene containing an appropriate group with unsaturated groups in the polymer. Where there is little or no residual unsaturation the desired polar groups may be introduced into the hydrocarbon polymer by substitution reactions, e.g. by halogenation, chlorosulphonation, chlor-carbonylation, phosphorylation or maleinisation. Where the hydrocarbon polymer contains an aromatic ring, such as in a styrene copolymer, the desired polar group may be introduced through aromatic substitution by the classical routes.

The solvated polymer used in this invention may, as a further alternative to an addition polymer, be a condensation polymer such as polyesters, aromatic polyethers and aromatic hydrocarbonates provided its molecular weight is high enough.

The gel strength to be developed in the organic liquids by use of this invention can be varied according to the particular requirements and circumstances of use. From the point of view of reducing spread of any spilled fuel, high gel strengths are desirable but there is a limit to gel strength which is set by the need to be able to transfer it from fuel tank to engine. This upper limit depends to a large extent on the arrangement of the fuel tankage and supply lines—obviously special systems can be developed for handling high gel strength fuels—but a rough indication of suitable gel strength useful in development work on the application of this invention can be obtained as follows.

An open-ended, internally-smooth cylinder 20 cm. in diameter and 20 cm. in height is stood on a flat plate, the lower open end of the cylinder forming a seal with the plate. The cylinder is then filled with the gelled liquid under test. After allowing the liquid to stand for sufficient time for the gel structure to reform, the cylinder is lifted vertically to leave the mass of gelled liquid standing unsupported on the plate. This unsupported mass will sag and spread out over the plate. If the mass spreads to such an extent that the resulting layer is only a millimetre or less in average thickness then the gel strength is insufficient to give a worthwhile improvement in safety. If the mass retains a maximum height of at least 10 cms. this is an indication that specially designed fuel systems, e.g. flexible tanks under external pressure, will be needed to handle it as aircraft fuel. If the gelled liquid spreads to such an extent that the average thickness is in the range 0.5–5 cms. this is an indication that it will provide a worthwhile improvement in safety and yet can be accommodated in standard or modified fuel systems.

The invention is illustrated by the following examples in which parts and proportions are by weight. All the gelled fuels described were satisfactory on storage in aircraft fuel tanks and could be pumped to and consumed in an aircraft gas turbine engine.

EXAMPLE 1

A 5% solution of a copolymer of stearyl methacrylate and dimethyl amino ethyl methacrylate (98:2) Mv. 500,000 in kerosene was blended with an equal weight of a 5% solution of a copolymer of stearyl methacrylate and methacrylic acid (98:2) Mv. 500,000 in kerosene. The resulting mixture developed a gel structure which broke down under shear and reformed rapidly when the stress was removed. A lump of the gel burned without flowing.

EXAMPLE 2

A mixture of 120 parts acetone, 80 parts isopropanol, 25.7 parts stearyl methacrylate, 0.92 part glycol dimethacrylate, 0.5 part isopropyl peroxydicarbonate and 45 parts of a 45% solution of carboxyl-terminated polymethyl methacrylate Mv.=10,000 reacted with glycidyl methacrylate was refluxed for 30 minutes. A mixture of 141.6 parts stearyl methacrylate, 5.14 parts glycol dimethacrylate and 3 parts isopropyl peroxydicarbonate was fed to the reflux return in 3.5 hours and refluxing was continued for 0.5 hour longer. The product was a 45% dispersion of particles of a crosslinked polymer stabilised in the acetone/isopropanol mixture by the solvated polymethyl methacrylate chains attached thereto. 90% of the organic liquid was removed and the polymer was added to kerosene in a proportion of 10% by weight of the kerosene. The polymethyl methacrylate chains initially solvated by the acetone/isopropanol collapsed but the polymer particles became swollen by the kerosene and a gel was formed which broke down under shear and reformed rapidly once the stress was removed. A lump of gell burned without flowing.

EXAMPLE 3

A latex of a copolymer of 2-ethyl hexyl acrylate and acrylic acid (9:1) of molecular weight 4.10$^6$ (weight average) was made by aqueous emulsion polymerisation. The copolymer was dissolved in kerosene by adding the latex to a refluxing mixture of kerosene and cyclohexane in the ratio of 9:1 at such a rate that the water did not build up in the refluxing mixture. At a concentration of 2.5% the copolymer weakly gelled kerosene due to formation of associative bonds between the carboxyl groups.

EXAMPLE 4

A latex of a styrene/butadiene/acrylic acid copolymer 60/30/10 was prepared by aqueous emulsion polymerisation. This was transferred to kerosene by the method described in Example 3, but due to random crosslinking by the butadiene component, the polymer particles did not dissolve but were dispersed in and swollen by the kerosene, A latex of a copolymer of 2-ethyl hexyl acrylate and dimethylaminoethyl methacrylate (4:1) Mw. 500,000 was made by aqueous emulsion polymerisation and the copolymer was dissolved in kerosene as in Example 3. When a 1.0% dispersion in kerosene of the carboxyl-containing copolymer was mixed with an equal volume of a 1.0% solution in kerosene of the amine-containing copolymer a gel was formed due to associative bonding between the carboxyl groups of the swollen particles and the amine groups of the dissolved copolymer.

EXAMPLE 5

8 parts of carbon black were dispersed in 100 parts of a 2% solution in kerosene of the amine-containing copolymer described in Example 4. A stiff gel was formed by associative bonding between the amine groups of the copolymer and carboxyl groups present on the surface of the particles of carbon black.

EXAMPLE 6

A 0.5% solution of N-cocohydroxybutyramide in kerosene was mixed with a 0.5% solution in kerosene of the polymer described in Example 3 at 50° C. The solution was cooled to room temperature when the N-cocohydroxybutyramide crystallised in the form of disperse particles. A gell was formed by associative bonding between the amide groups of the particles and the carboxyl groups of the soluble copolymer.

EXAMPLE 7

1 part of calcium acetate was added to 100 parts of a 1% solution in kerosene of the polymer described in Example 3 at 140° C. Acetic acid distilled off and when the solution was cooled to room temperature a gel was formed as a result of associative crosslinking of the carboxyl groups of the dissolved copolymer by calcium salt formation.

EXAMPLE 8

500 parts of a 1% solution in kerosene of the amine-containing copolymer described in Example 4 was heated to 120° C. and 1 part of propane sultone was added. The mixture was maintained at 120° C. for 2 hours. When the solution was cooled to room temperature a gel was formed due to associative bonding between the sulphobetaine Zwitter ion groups.

EXAMPLE 9

A 1% solution in kerosene of a copolymer of 2-ethyl hexyl acrylate, acrylic acid and dimethylaminoethyl methacrylate (96:2:2) Mw. $3.10^6$ was prepared by the method described in Example 3. The solution was gelled by associative bonding between the carboxyl and amine groups of the copolymer.

EXAMPLE 10

A copolymer of 2-ethyl hexyl acrylate and acrylamide (90:10) Mw. $2.10^6$ was made and dissolved in kerosene as described in Example 3. A 1% solution was gelled by associative bonding between the amide groups of the dissolved copolymer.

EXAMPLE 11

5 parts of a copolymer of lauryl methacrylate and hydroxy propyl methacrylate (1:1) Mw. $2.10^6$ were dissolved in 95 parts of hot (60–70° C.) kerosene. On cooling to room temperature a weak gel was formed by associative bonding of the hydroxyl groups of the copolymer.

EXAMPLE 12

A 1% solution in decahydronaphthalene of the carboxyl-containing copolymer described in Example 3 was mixed with a 1% solution in decahydronaphthalene of the amine-containing copolymer described in Example 4 in the ratio of 5:1. A similar, but weaker, gel was formed using 0.5% solutions.

EXAMPLE 13

The amine-containing copolymer used in Example 12 was replaced by a copolymer of 2-ethyl hexyl acrylate and pyridine (4:1) Mw. 500,000. Substantially similar results were obtained as a result of associative bonding between the acid and base groups.

EXAMPLE 14

A dispersion of particles of a copolymer of maleic anhydride and styrene (1:1) Mw. $2.10^6$ was prepared by dispersion polymerisation of the monomers in kerosene. The particulate copolymer was then reacted in the kerosene by adding di-dodecylamine in the proportion of 2:3.5 and heating to a temperature of 100° C. The resulting substituted amide acid was soluble in the kerosene. A 3% solution of the reacted copolymer in kerosene was gelled by associative bonding between the carboxyl groups of the acid amide.

EXAMPLE 15

500 parts of a 2% solution in kerosene of the substituted acid amide described in Example 14 were heated to 140° C. and 2 parts of zinc acetate were added. Acetic acid distilled off and on cooling to room temperature a gel was formed as a result of associative crosslinking of the carboxyl groups of the acid amide by zinc salt formation.

EXAMPLE 16

1 part of dimethyl sulphate was added to 500 parts of a 1% solution in kerosene of the amine-containing copolymer described in Example 4 and the mixture was heated to 60° C. 1 hour and then cooled to room temperature. The polymeric quarternary ammonium salt so formed was treated with a basic ion exchange resin to form the quaternary ammonium hydroxide. This solution was mixed with equal weight of a 1% solution of a copolymer of 2-ethyl hexyl acrylate and vinyl sulphonic acid (95:5) Mw. $2.10^6$ in kerosene. The resulting mixture was a very stiff gel due to strong associative bonding between the acid groups and the quaternary ammonium hydroxide groups.

EXAMPLE 17

A solution of 7 parts of a graft copolymer of polylauryl methacrylate (Mv. $10^6$) and polymethyl methacrylate (Mv. 10,000)—an average of 30 chains/backbone—in 20 parts of xylene was diluted with 73 parts of aliphatic hydrocarbon (boiling range 140–190° C.). The polylauryl methacrylate backbone of the copolymer remained solvated by the mixture of hydrocarbons, but the polymethyl methacrylate side chains collapsed and the weak dipoles of the ester carbonyl groups of the side chain reinforced each other in compound polar groups. A gel was formed by associative bonding between these compound polar groups on the backbone.

The kerosene used in the foregoing examples was aviation kerosene (Avtur/50). Similar results were obtained using aviation kerosenes of the types known as JP1 and JP5, aviation turbine gasoline (Avtag) and the wide cut gasoline known as JP4.

Where the gelled liquids described in the examples are obtained by mixing two polymer solutions then in fuelling an aircraft this mixing can be done by simultaneously feeding the liquids to the aircraft and bringing them together at or just before the fuel inlet to the aircraft.

We claim:

1. An aviation fuel comprising a gelled hydrocarbon liquid containing polymeric material of viscosity average molecular weight at least 10,000 which is solvated by the liquid and contains a sufficient unmber of polar groups which form associative bonds arising from electrostatic attraction between polymer molecules to cross-link said polymeric material, the associative bonds being of bond energy at least corresponding to that of hydrogen bonds formed between —OH groups of ROH reacting with —O— groups of ROR' in the hydrocarbon liquid where R and R' are alkyl, but less than that of a C—C covalent bond, the crosslinked polymer structure formed by the associative bonding of the polar groups causing the liquid to be gelled to the extent that a cylinder of the gelled liquid 20 cm. in diameter and 20 cm. in height, when standing on a flat plate, will sag and spread to have a height greater than 1 mm. and less than 10 cm.

2. A liquid as claimed in claim 1 in which the solvated polymeric material is dissolved in the liquid.

3. A liquid as claimed in claim 1 in which the solvated polymeric material is swollen by the liquid.

4. A liquid as claimed in claim 1 in which part of the solvated polymeric material is dissolved in the liquid and part is in the form of swollen particles.

5. A liquid as claimed in claim 2 also containing disperse particles of non-solvated combustible material containing polar groups which form associative bonds with polar groups of the dissolved polymeric material.

6. A liquid as claimed in claim 2 in which the polar groups forming the asociative bonds are of different but complementary types, each type being contained in a different polymer.

7. A liquid as claimed in claim 1 containing from 0.1–10% by weight of solvated polymeric material.

8. A fuel as set forth in claim 1 in which the height to which the fuel will sag is at least 0.5 cm.

9. A liquid as claimed in claim 1 in which the polar groups forming the associative bonds are of different but complementary types.

10. A fuel as set forth in claim 1 wherein the hydrocarbon liquid is a gas turbine engine fuel.

References Cited

UNITED STATES PATENTS

| | | | |
|---|---|---|---|
| 2,553,568 | 5/1951 | Finkelstein | 44—7 C |
| 3,219,619 | 11/1965 | Dickerson | 44—7 C |
| 3,391,081 | 7/1968 | Conrady | 44—7 C |
| 3,460,922 | 8/1969 | Winkler | 44—7 C |

BENJAMIN R. PADGETT, Primary Examiner

U.S. Cl. X.R.

44—7 E; 149—109